United States Patent
Birkel et al.

[11] Patent Number: 5,925,857
[45] Date of Patent: Jul. 20, 1999

[54] INVERTED CONE TUNED EXHAUST SYSTEM

[76] Inventors: Jeffrey F. Birkel, 4004 Hollow Trace Dr., Peoria, Ill. 61615; Paul T. Corcoran, 300 Daniel Pkwy., Washington, Ill. 61671

[21] Appl. No.: 08/917,611

[22] Filed: Aug. 26, 1997

Related U.S. Application Data

[60] Provisional application No. 60/025,038, Aug. 27, 1996.

[51] Int. Cl.⁶ .................................................. F01N 1/02
[52] U.S. Cl. ........................ 181/250; 181/264; 181/273
[58] Field of Search ..................................... 181/227, 228, 181/230, 247, 249, 250, 255, 264, 269, 273, 276

[56] References Cited

U.S. PATENT DOCUMENTS

| | | | |
|---|---|---|---|
| 1,597,397 | 8/1926 | Wilkinson | 181/269 |
| 1,685,701 | 9/1928 | Blanchard | 181/247 |
| 1,922,848 | 8/1933 | Harley | 181/228 |
| 2,671,523 | 3/1954 | Walker | 181/264 |
| 3,884,323 | 5/1975 | Kuntz | 181/247 |
| 4,226,298 | 10/1980 | Bancel et al. . | |
| 4,348,862 | 9/1982 | Fujikawa et al. . | |
| 5,012,642 | 5/1991 | Laimbock . | |
| 5,044,159 | 9/1991 | Landfahrer et al. . | |
| 5,079,918 | 1/1992 | Stull . | |

FOREIGN PATENT DOCUMENTS

| | | |
|---|---|---|
| 275719 | 9/1988 | Germany . |
| 54-17417 | 2/1979 | Japan . |
| 54-20217 | 2/1979 | Japan . |

*Primary Examiner*—Khanh Dang
*Attorney, Agent, or Firm*—Richard C. Litman

[57] ABSTRACT

An expansion chamber for the exhaust system of two cycle engines. The expansion chamber includes a diverging section and a converging section. The diverging section has a continually increasing cross-sectional area. A terminal section is integrally attached to the diverging section. A reflective cone is disposed within the terminal section and secured thereto. The converging section is defined by the area contained between the terminal section and the reflective cone. Devices are also provide for directing exhaust gases into and out of the expansion chamber. The reflective cone may be positioned entirely within the diverging section or anywhere between the diverging section and the terminal section, depending on specific performance characteristics desired. The reflective cone may also be secure in various ways depending on its placement.

7 Claims, 8 Drawing Sheets

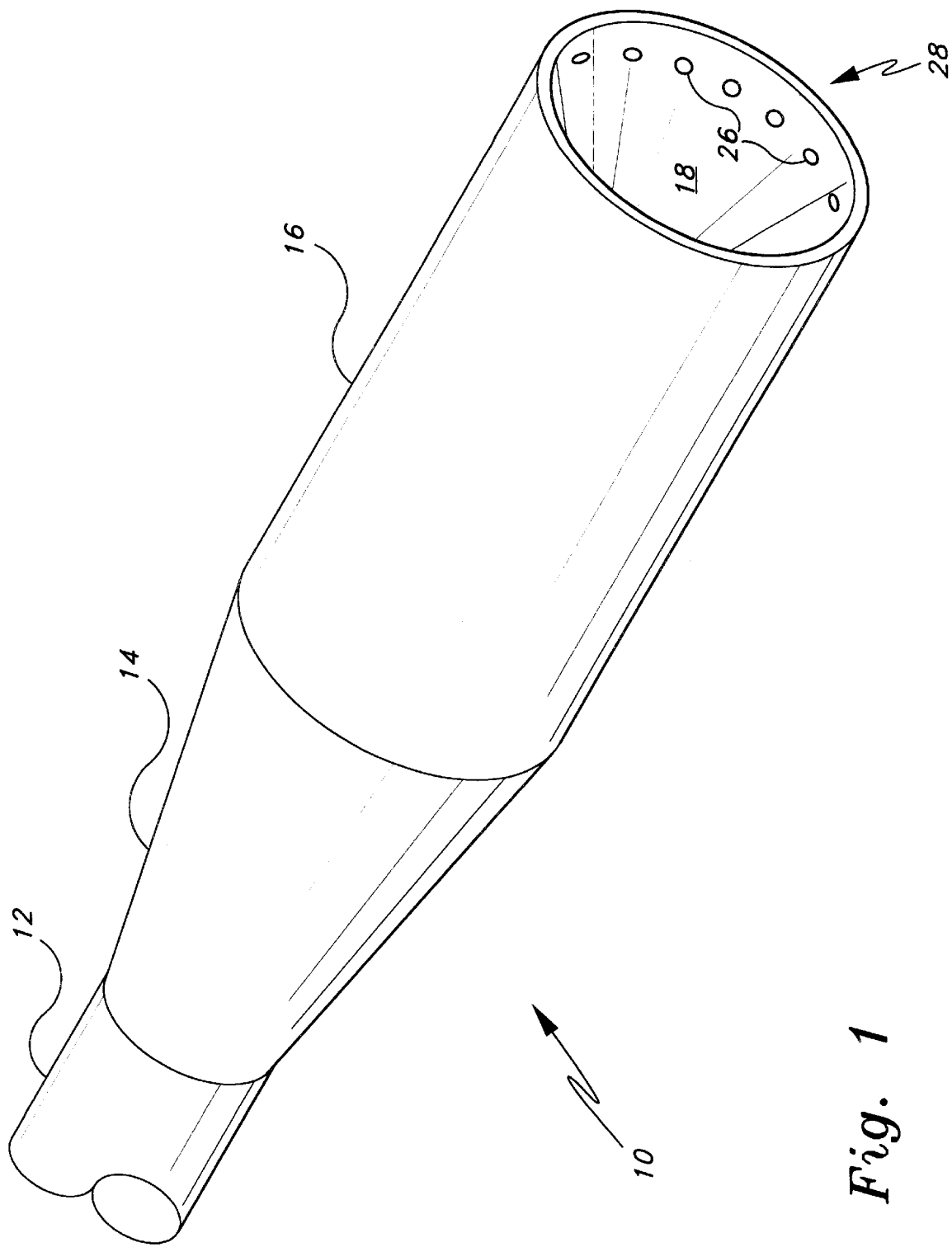

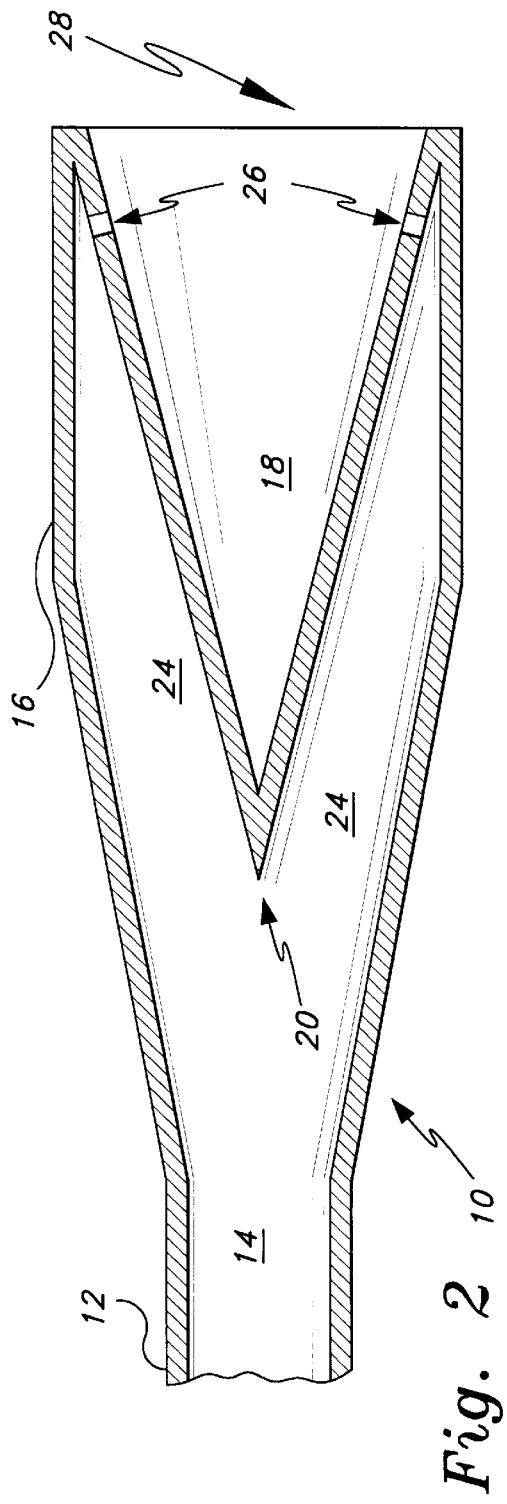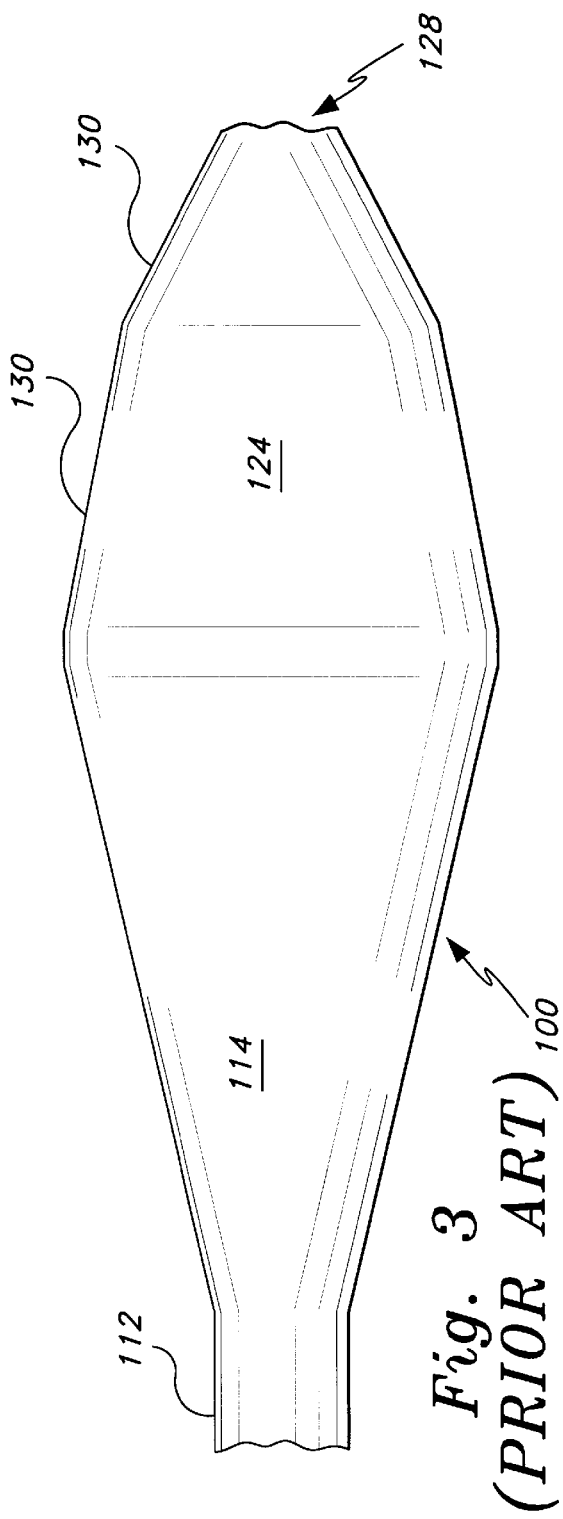

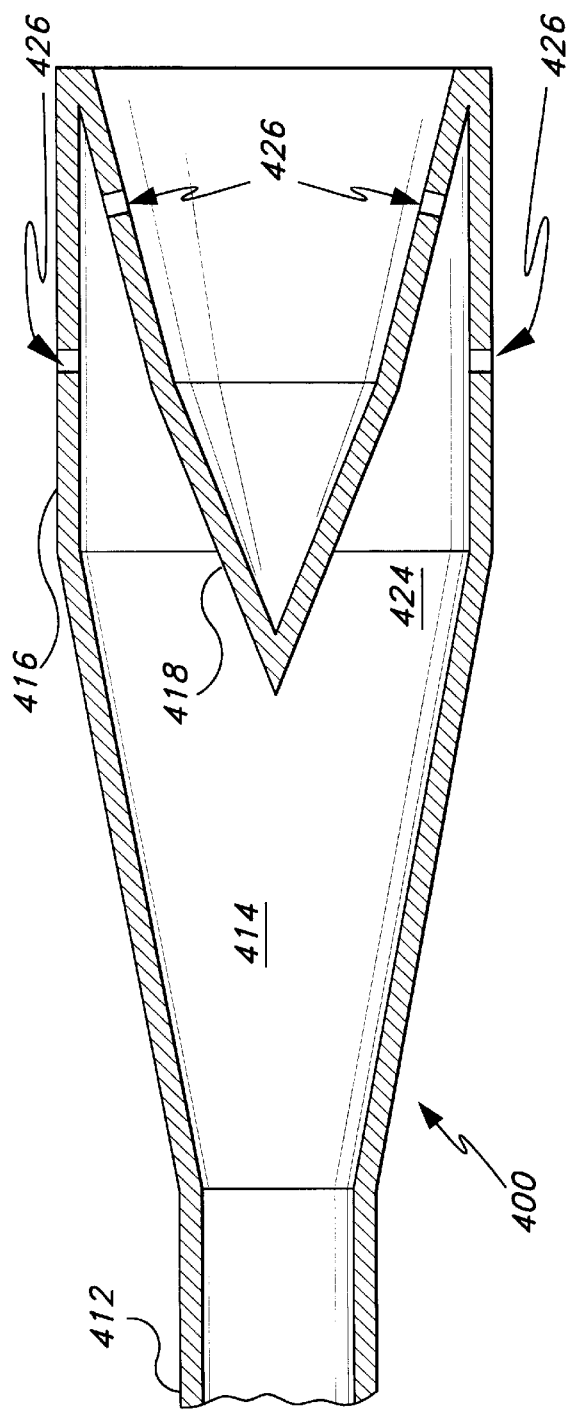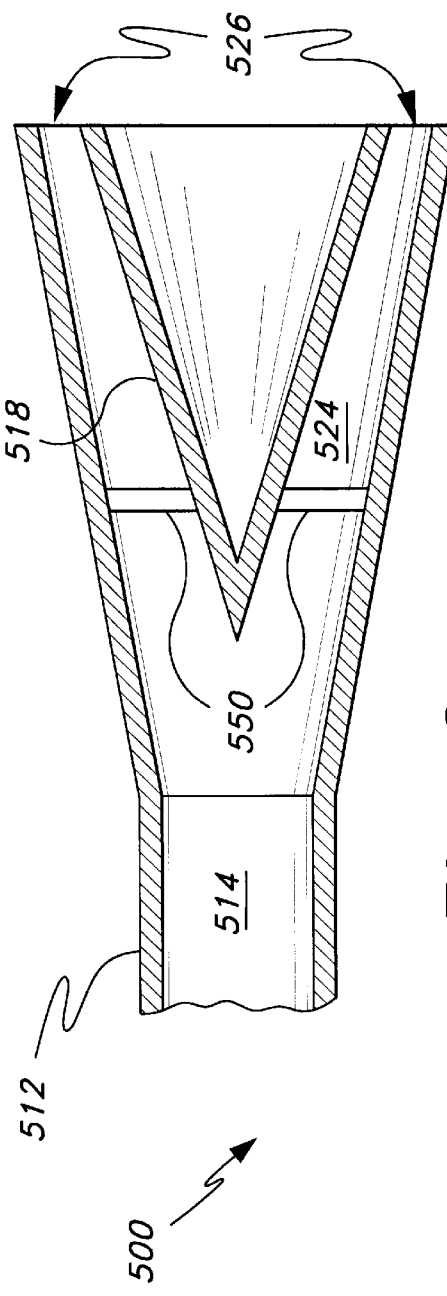

INVERTED CONE TUNED EXHAUST SYSTEM

CROSS-REFERENCE TO RELATED APPLICATION

This application claims the benefit of U.S. Provisional Patent Application Ser. No. 60/025,038, filed Aug. 27, 1996.

BACKGROUND OF THE INVENTION

1. Field of the Invention

The present invention relates to exhaust systems for two stroke engines and more particularly to those exhaust systems which are tuned or incorporate expansion chambers. The invention relates specifically to a tuned exhaust system which incorporates a uniquely oriented converging cone.

2. Description of the Related Art

Internal combustion engines, particularly the two stroke variety, have long been in existence. However, the use of two stroke engines with high power ratings has been restricted to a very narrow r.p.m. range because the level of performance tends to drop rapidly in the lower r.p.m. values. This drop in performance is a result of the dynamics of the gases flowing through the exhaust system. The dynamics of the gases have a strong influence on gas exchange during the scavenging phase and ultimately on engine performance.

It is well known that an expansion chamber, utilizing the sonic energy in the exhaust stream, can be used to provide and shape a pressure pulse that is returned to the exhaust port of a two stroke engine. When properly applied, an expansion chamber can improve the performance and scavenging effects in a two stroke engine. Two stroke engines having an exhaust system incorporating an expansion chamber typically contain a first pipe of constant cross-sectional dimension extending from the exhaust port. The first pipe is followed by a diffuser section having a divergent wall which defines a progressively expanding cross-section. The diffuser section is used for generating a negative pressure wave, or vacuum, for drawing out exhaust gases from the engine. The diffuser ultimately leads to a conical section, or baffle, having a convergent wall which defines a progressively decreasing cross-section. The conical section is used to generate a positive pressure wave directed back at the exhaust port. A short piece of pipe is typically situated aft of the conical section in order to allow the exhaust gases to exit the expansion chamber.

When the exhaust port is opened, a pressure pulse travels outward. A negative pressure wave is generated in the diffuser section as the outward pressure pulse travels through the diffuser. This negative pressure wave increases the scavenging of combusted fuel from the engine. During passage of the outward pressure pulse through the converging or baffle section, a positive pressure wave is generated. The positive pressure wave is reflected back to the cylinder, while the exhaust port is still open, and increases the pressure therein. This positive pressure wave also causes any non-combusted fuel and air mixture, which has entered the exhaust pipe from the cylinder during the scavenging phase, to return into the cylinder, thus further charging the cylinder.

The shape of the pressure waves generated by the expansion chamber, both negative and positive, is determined primarily by the rate of change of cross sectional area of the expansion chamber. In essence, the shape of the pressure wave is proportional to the square of the primary dimension of the expansion chamber; diameter of a circle, length of a side of a square, etc. Therefore, in a conventional design, the reflected pressure wave from the converging cone increases rapidly as the outward pressure pulse enters the cone and more slowly as the outward pulse travels the length of the cone. The inverse is true in the inverted cone. The reflected positive pressure wave increases more rapidly as the outward pressure pulse approaches the end of the cone. Therefore, the reflected positive pressure wave has a sharper cut-off with the inverted cone, which provides for more of the energy contained within it to be captured by the closing of the exhaust port.

The prior art provides various systems for improving the operation of a two stroke engine. For example, U.S. Pat. No. 4,226,298 issued on Oct. 7, 1980 to Bancel et al. discloses an exhaust system for internal combustion engines. The exhaust system includes a first diverging section which extends into a cylindrical envelope. A streamlined conical member is axially mounted within the cylindrical envelope and adapted to be moveable in relationship to the engine rating.

U.S. Pat. No. 4,348,862 issued on Sep. 14, 1982 to Fujikawa et al. discloses an exhaust system for a two cycle engine which includes a second expansion chamber having a diffuser in pneumatic connection with a first expansion chamber. The second expanding chamber creates a second pressure drop substantially adjacent the point of pneumatic connection between the first and second expansion chambers. This second pressure drop acts to draw exhaust gases present at the conically divergent section of the first expansion chamber's diffuser.

U.S. Pat. No. 5,012,642 issued on May 7, 1991 to Laimbock discloses an exhaust system for two stroke internal combustion engines which includes a diffuser adapted to be connected to the engine. A baffle is provided downstream of the diffuser and a catalytic converter is disposed between the diffuser and the baffle. The system also includes a diffuser discharge pipe which extends into the diffuser and is much smaller in diameter than the larger diameter of the exhaust system. The diffuser discharge pipe extends from a location adjacent the exhaust gas outlet of the cylinder and the inlet of the diffuser, and merges into the catalytic converter by means of a steep funnel. This ensures that the catalytic converter will be lighted quickly and that gas dynamics will not be adversely affected.

U.S. Pat. No. 5,044,159 issued on Sep. 3, 1991 to Landfahrer et al. discloses an exhaust system for two stroke engines having an exhaust pipe followed by two or more conical sections. The exhaust pipe is of constant cross-section while the conical sections are configured as diffusers having increasing cross-sections. The conical sections are connected to the front end of the exhaust pipe by means of branch pipes of different length. Using this arrangement, a pressure wave coming from the cylinder is twice reflected as a suction wave back to the cylinder. Thus the effective duration of the suction wave is prolonged over that of comparable exhaust systems.

U.S. Pat. No. 5,079,918 issued on Jan. 14, 1992 to Stull discloses an expansion tube exhaust system for internal combustion engines. The system includes a short diverging section connected to a much longer converging section. The longer converging section absorbs negative pressure returning to the engine, thus reducing back pressure to the cylinder. This system is particularly useful in four stroke engines.

Japanese Patent No. 54-17417 and 54-20217, both issued on February 1979, disclose various exhaust systems which incorporate conical sections designed to improve engine output in the high speed region by having a pressure wave reflected from the exhaust system.

East German Patent No. 275,719 issued on September 1988 discloses an exhaust system which incorporates various designs of conical sections to improve output.

None of the above inventions and patents, taken either singly or in combination, is seen to describe the instant invention as claimed.

SUMMARY OF THE INVENTION

Accordingly, it is a principal object of the invention to provide an improved exhaust system for two stroke engines.

It is another object of the invention to provide an exhaust system having an inverted reflective cone in the converging portion of the expansion chamber.

It is a further object of the invention to provide an expansion chamber which minimizes the maximum and minimum path length between the front and rear of the expansion chamber.

Still another object of the invention is to provide an expansion chamber capable of improving the horsepower and torque of a two cycle engine.

Still a further object of the invention is to provide an exhaust system which allows a designer to simultaneously achieve a desired cross-sectional area at a predetermined distance from the inlet and a desired expansion chamber volume.

It is an object of the invention to provide improved elements and arrangements thereof in an apparatus for the purposes described which is inexpensive, dependable and fully effective in accomplishing its intended purposes.

In accordance with the objects of the invention an expansion chamber is provided for the exhaust system of a two-stroke engine. The expansion chamber includes an inlet which is used to direct the exhaust gases from the cylinder into the expansion chamber. A diverging section of predetermined length is integrally attached to the inlet. The diverging section has a cross-sectional area which increases continually as it extends from the inlet. A terminal section of predetermined length is integrally attached to the diverging section. The terminal section has a constant cross-sectional area throughout its length. In an alternative embodiment of the invention, the terminal section is provided with a varying cross-sectional area depending on a designer's requirements to have a specific cross-section located a specific distance from the inlet.

An inverted reflective cone is centrally placed within the terminal section. The reflective cone is oriented such that its apex is substantially coincident to the plane at which the diverging section and the terminal section meet. The diameter of the reflective cone continually increases towards the outer end of the terminal section. The reflective cone terminates at the end plane of the terminal section. The area between the reflective cone and the terminal section defines a converging section. An outlet is also provided for directing exhaust gases out of the expansion chamber.

The reflective cone may be secured to the expansion chamber in a number of ways. In one embodiment of the invention, an annular plate is provided for integrating the reflective cone with the terminal section. The annular plate is dimensioned to correspond to the difference between the cross-sectional diameters of the reflective cone and the terminal section. The annular plate is sufficiently rigid that it is capable of supporting the reflective cone in a fixed position.

In another embodiment of the invention, the reflective cone is provided with a terminal cross-sectional diameter which allows a snug fit against the terminal section. The two are then secured with appropriate fastening means such as welding, riveting, screwing, etc.

In an alternative embodiment of the invention, the reflective cone is secured by a plurality of support members which are internal of the expansion chamber. The support members extend from the terminal section to the reflective cone. The support members should be sufficiently rigid that the reflective cone is supported in a fixed position.

The outlet of the expansion chamber can be in various forms. For example if an annular plate is used, a number of apertures may be provided in the annular plate in order to constitute the outlet. However, the outlet does not need to occupy a particular location in the expansion chamber. A plurality of apertures may be provided along the surface of the terminal section in order to constitute the outlet. Similarly, a plurality of apertures may be provided in the surface of the reflective cone in order to constitute the outlet. Furthermore, the apex of the reflective cone may be truncated so as to define an aperture which constitutes the outlet. If support members are used to secure the reflective cone to the expansion chamber, use of an annular plate may be eliminated. The resulting cavity between the reflective cone and the terminal section would thus define the outlet.

In a preferred embodiment of the invention, the inverted cone is positioned such that its apex originates from within the diverging section of the expansion chamber. This results in a smooth transition between the diverging and converging areas with no discontinuities. Furthermore, by adjusting the position of the inverted cone, the difference between the minimum and maximum path length between the front and rear of the expansion chamber is minimized. The minimum path length between the front and rear of the expansion chamber is the path which follows as direct a line as possible. On the other hand, the maximum path length is one which is tangent to the wall of the expansion chamber and follows all of the angular variations in the expansion chamber. As the reflective cone is increasingly overlapped with the diverging section, the difference between the minimum and maximum path lengths approaches zero. Performance of the expansion chamber may be improved for various applications by providing multiple angles in the reflective cone, or by having a continuously variable reflective cone.

These and other objects of the present invention will become readily apparent upon further review of the following specification and drawings.

BRIEF DESCRIPTION OF THE DRAWINGS

FIG. 1 is a perspective view of a reflective cone exhaust system in accordance with a first embodiment of the present invention.

FIG. 2 is a cross-sectional view of the reflective cone exhaust system of the first embodiment.

FIG. 3 is a cross-sectional view of a tuned exhaust system of the prior art.

FIG. 7 is a cross-sectional view of an expansion chamber in accordance with a fifth embodiment of the present invention.

FIG. 8 is a cross-sectional view of an expansion chamber in accordance with a sixth embodiment of the present invention.

Similar reference characters denote corresponding features consistently throughout the attached drawings.

DETAILED DESCRIPTION OF THE PREFERRED EMBODIMENT

Figure 4:
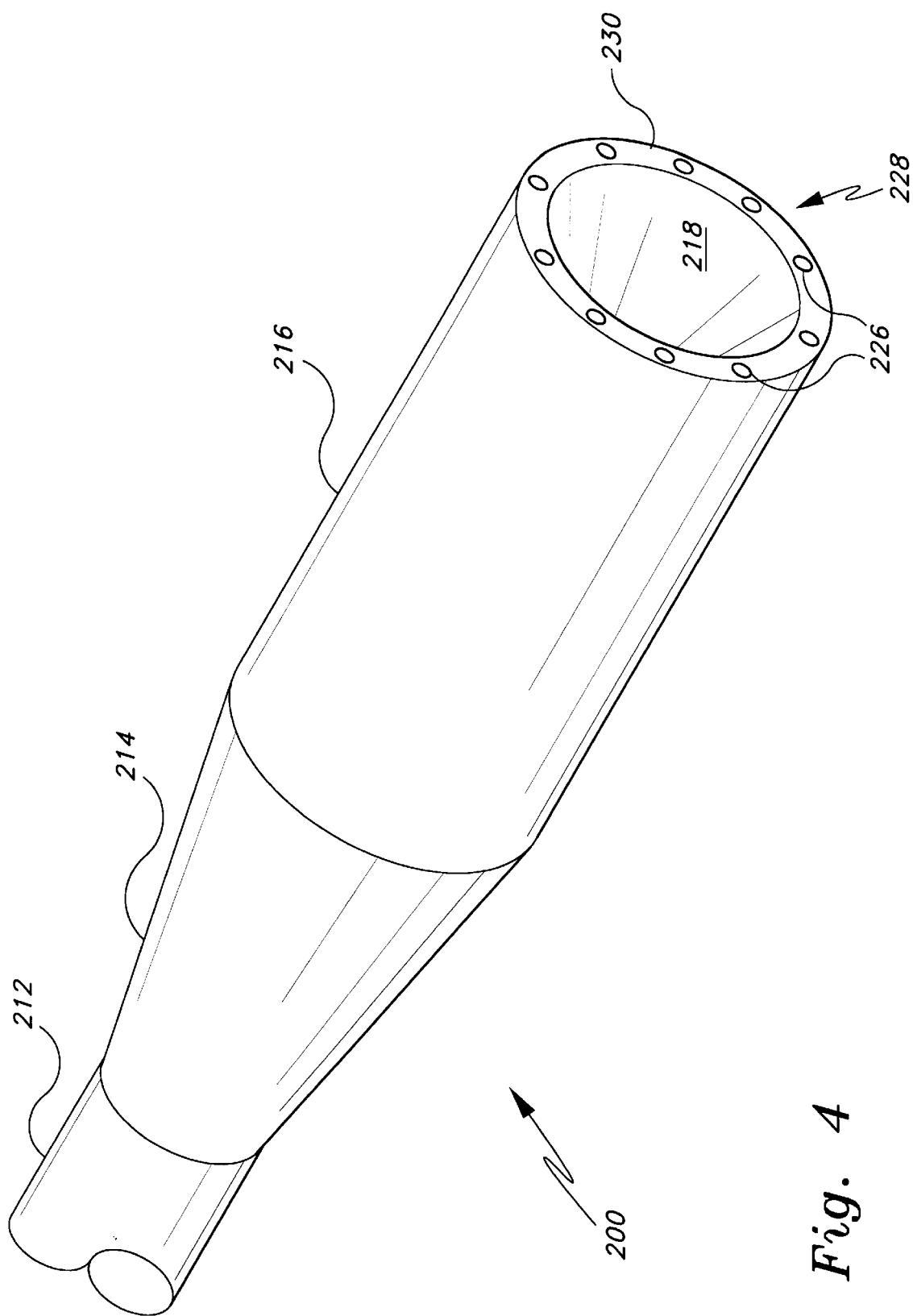
FIG. 4 is a perspective view of an expansion chamber in accordance with a second embodiment of the present invention.

With reference to the drawings and initially to FIGS. 1 and 2, there is shown an expansion chamber 10 for the exhaust system of a two-stroke engine in accordance with the present invention. The expansion chamber 10 includes an inlet 12, a diverging section 14, a converging section 24, and an outlet 28.

The inlet 12 has a constant diameter and is integrally connected to the diverging section 14. The diverging section 14 has a cross-sectional area which continually increases with respect to the distance from the inlet 12. A terminal section 16 is integrally connected at one end to the diverging section 14 and extends therefrom, terminating at an opposite end. Depending on specific requirements, the terminal section 16 may contain a constant diameter throughout its length, or the diameter may vary. A terminal section 16 having a varying cross-section is beneficial to a designer seeking to obtain a desired cross-section at a specific distance from the inlet 12.

A reflective cone 18 is oriented such that its apex 20 points in the direction of the inlet 12. The reflective cone 18 is then aligned with the terminal section 16. The diameter of the base of the reflective cone 18 and the diameter of the terminal end of the terminal section 16 are dimensioned such that a snug contact is formed between the terminal section 16 and the reflective cone 18. The area between the exterior surface of the reflective cone 18 and the interior surface of the terminal section 16 defines the converging section 24 of the expansion chamber 10. The converging section 24 is such that it has an effective cross-sectional area which continually decreases toward the terminal end of the terminal section 16. A plurality of apertures 26 is circumferentially disposed in the reflective cone 18 adjacent its base and proximate the point where the reflective cone 18 meets the terminal section 16. The apertures 26 collectively define the outlet 28 of the expansion chamber 10.

In operation, an outward pressure pulse leaves the cylinder when the exhaust port opens. The outward pressure pulse enters the expansion chamber 10 through the inlet 12 and travels through the diverging section 14. As the outward pressure pulse travels through the inlet 12 and diverging section 14, a negative pressure wave is reflected back at the exhaust port. This negative pressure wave creates a scavenging effect which acts to suction combusted fuel from the cylinder.

While scavenging combusted fuel from the cylinder, the negative pressure wave may also pull an amount of non-combusted fuel and air mixture from the cylinder. As the outward pressure pulse passes through the converging section 24 of the expansion chamber 10, the reflected pressure wave begins to increase until the negative pressure wave becomes positive. As the outward pressure pulse travels through the continually decreasing cross-section of the converging section 24, the positive pressure wave continues to build strength as it is reflected back towards the cylinder. The positive pressure wave forces any uncombusted fuel and air mixture, which was pulled into the expansion chamber 10, back into the cylinder. The effective result is that the cylinder is now charged with an increased amount of fuel and air mixture. Thus, the effect of the positive pressure wave is similar to that of a turbocharger or supercharger. The difference being that no additional moving parts are required, thus resulting in simplicity and savings in weight.

Turning now to FIG. 3, there is shown an expansion chamber 100 of the prior art. The expansion chamber 100 includes an inlet 112, a diverging section 114, a converging section 124, and an outlet 128. The diverging section 114 is integral with the inlet 112 and is characterized by an increasing cross-sectional diameter. The converging section 124 is integral with the diverging section 114 and characterized by a decreasing cross-sectional diameter. The converging section 124 terminates at the outlet 128. In order to better tune the exhaust, the converging and diverging sections 124, 114 may include a plurality of angled sections 130.

Exhaust gases enter the expansion chamber 100 through the inlet 112 and travel through the diverging section 114. As the outward pressure pulse travels through the inlet 112 and diverging section 114, a negative pressure wave is reflected back at the exhaust port. The negative pressure wave is intensified in the diverging section 114 and becomes increasingly negative. The negative pressure wave creates a scavenging effect which acts to suction combusted fuel from the cylinder. While scavenging combusted fuel from the cylinder, the negative pressure wave also pulls an amount of uncombusted fuel and air mixture from the cylinder.

With continued reference to FIG. 3 and renewed reference to FIG. 2, it is seen that the diverging section 14 of the expansion chamber 10 of the present invention is similar to the diverging section 114 of the prior art. Rather than providing a converging section 124 which is integral with the diverging section 114 as in the prior art, the present invention disposes a reflective cone 18 within the terminal section 16 in order to provide an effective converging section 24 having a continually decreasing cross-sectional area which decreases at an increasing rate of change.

Turning again to FIG. 3, it is seen that as the exhaust gases pass through the converging section 124 of the expansion chamber 100, the pressure begins to increase until the negative pressure wave becomes positive. As the outward pressure pulse travel through the transition between the diverging section 114 and the converging section 124, an abrupt change in cross-sectional area occurs. This change results in inefficient use of the energy contained in the pressure pulse and therefore reduces the energy available to generate a reflected pressure wave. By using a reflective cone 18, a smoother transition is made in the rate of change of the cross-sectional area. While the positive pressure wave of the prior art is reflected back towards the cylinder, it lacks the useable energy present in the positive pressure wave generated by the converging section 24 of the present expansion chamber 10. Consequently, less of the uncombusted fuel and air mixture which was pulled into the expansion chamber 100 is forced back into the cylinder when the expansion chamber 100 of the prior art is used.

Turning again to FIG. 2, the apex 20 of reflective cone 18 is seen to extend into a portion of the diverging section 14 with the majority of the reflective cone 18 positioned entirely within the converging section 24. However, this need not always be the case. By overlapping the reflective cone 18 with the diverging section 14, a smoother transition zone is created between the diverging and converging sections 14, 24. The overlap causes the rate of change of the cross-sectional area to decrease as the diverging section 14 reaches its maximum cross-sectional area.

The reflective cone 18 also minimizes the difference in the minimum and maximum path length between the front and rear of the expansion chamber 10. The minimum path length between the front and rear of the expansion chamber 10 is the path which follows as direct a line as possible. On the other hand, the maximum path length is one which is tangent to the wall of the expansion chamber 10 and follows all of the angular variations therein. As the reflective cone 18 is increasingly overlapped with the diverging section 14, the difference between the minimum and maximum path lengths approaches zero.

The reflective cone 18 provides several significant advantages to a designer. The reflective cone 18 allows the designer easily to achieve a desired cross-sectional area at a predetermined distance from the inlet 12. In tuning the exhaust of an engine, it is well known that one of the parameters which effects performance is the volume of the expansion chamber 10. By using a reflective cone 18, however, the designer is capable of easily providing multiple tuned lengths for the same volume of the expansion chamber 10. The reverse is also true in that multiple expansion chamber 10 volumes may be provided for a single tuned length. Achieving the same results through the conventional methods of the prior art has proven to be exceptionally difficult. Finally, the maximum strength of the positive pressure wave is better controlled with an expansion chamber 10 which utilizes a reflective cone 18 in comparison to a conventionally designed expansion chamber. This is due both to the flexibility which the reflective cone 18 provides through overlapping and its continuously increasing rate of change in cross-sectional area.

Turning now to FIG. 4, there is shown an expansion chamber 200 according to a second embodiment the present invention. The expansion chamber 200 includes an inlet 212, a diverging section 214, a converging section (not shown), and an outlet 228. The inlet 212 has a constant cross-sectional diameter and is integrally connected to the diverging section 214, which has a continually increasing cross-sectional diameter. A terminal section 216 which has a constant cross-sectional diameter is integrally connected to the diverging section 214 and extends therefrom. A reflective cone 218 is oriented such that its apex points in the direction of the inlet 212 and aligned with the terminal section 216. The cross-sectional diameter of the base of the reflective cone 218 is smaller than the cross-sectional diameter of the terminal section 216 by a predetermined length. An annular plate 230 is provided for integrating the reflective cone 218 with the terminal section 216. The annular plate 230 is dimensioned to correspond to the difference between the cross-sectional diameters of the reflective cone 218 and the terminal section 216. The annular plate 230 is sufficiently rigid that it is capable of supporting the reflective cone 218 in a fixed position. A plurality of apertures 226 may be provided in the annular plate 230 in order to constitute the outlet 228. The area between the reflective cone 218 and the terminal section 216 defines the converging section of the expansion chamber 200. The converging section is such that it has an effective cross-sectional area which continually decreases from the apex of the reflective cone 218 to the annular plate 230.

Figure 5:
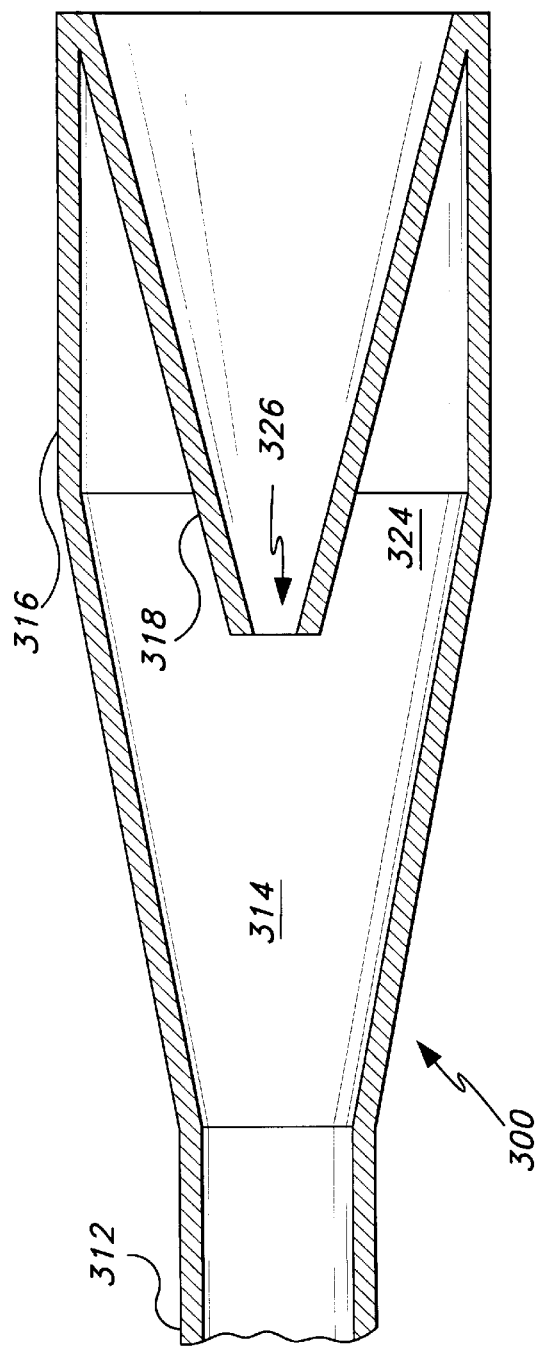
FIG. 5 is a cross-sectional view of an expansion chamber in accordance with a third embodiment of the present invention.

FIG. 5 illustrates an expansion chamber 300 in accordance with a third embodiment of the present invention. The expansion chamber 300 includes an inlet 312, a diverging section 314 and a terminal section 316. A reflective cone 318 is sized and positioned entirely within the terminal section 316. Such a design situation can often provide an area underlap between the diverging section 314 and the terminal section 316. The underlap section provides an area of constant cross-sectional area based on the distance between the apex of the reflective cone 318 and the plane where the terminal section 316 connects to the diverging section 314. A converging section 324 is subsequently created by the area between the reflective cone 318 and the terminal section 316. The reflective cone 318 is truncated such that an aperture 326 is formed to define the outlet of the expansion chamber 300.

Figure 6:
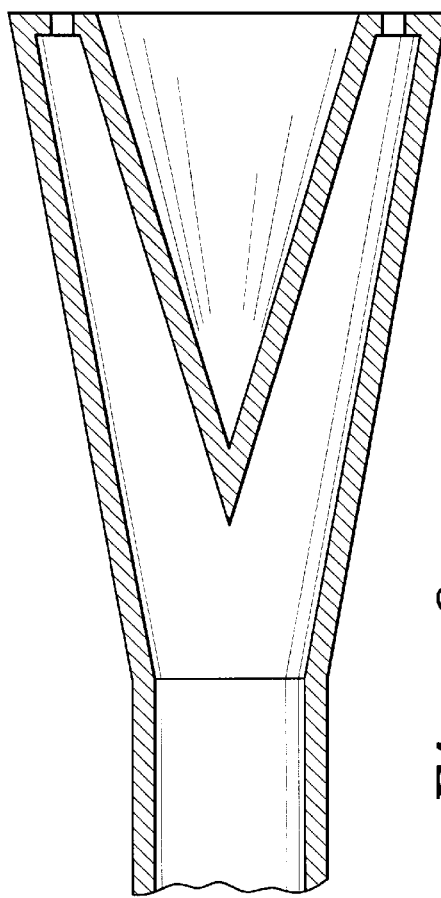
FIG. 6 is a cross-sectional view of an expansion chamber in accordance with a fourth embodiment of the present invention.

In essence, the reflective cone may occupy any location within the expansion chamber. For example, the inverted cone may completely or substantially overlap the diverging section, as illustrated in FIG. 6. Such an embodiment eliminates the need for a terminal section in the expansion chamber. Furthermore, the converging section of such expansion chambers is defined by the change in cross-sectional area between the diverging section and the reflective cone.

FIG. 7 illustrates a fifth embodiment of the present invention. An expansion chamber 400 is provided with an inlet 412, a diverging section 414 and a terminal section 416. A reflective cone 418 is sized and positioned so that it originates in the diverging section 414 and terminates at the same plane as the terminal section 416. A converging section 424 is subsequently created by the area between the reflective cone 418 and the terminal section 416. A plurality of apertures 426 are on the reflective cone 418 and the terminal section 426 to define the outlet of the expansion chamber. As seen in FIG. 7, the reflective cone 418 includes multiple angles thereon, resulting in a reflective cone having a change in cross sectional area which varies along the length of the cone. Such a design may improve the overall performance of the expansion chamber 400. Performance of the expansion chamber 400 may also be increased by providing a continuously variable reflective cone. A continuously variable reflective cone is one in which the cone angle varies continually along the length of the reflective cone. Alternatively a terminal section having a varying cross-section can be used to achieve the same effect as the continuously variable reflective cone.

As previously mentioned, the reflective cone may be secured within the expansion chamber in a number of ways, including welding or riveting. FIG. 8 illustrates a sixth embodiment of the invention wherein an expansion chamber 500 is provided with diverging section 514 and a reflective cone 518 positioned entirely within the diverging section 514. A plurality of support members 550 are radially disposed within the expansion chamber 500 in order to secure the reflective cone 518. Each support member 550 has one end coupled to the diverging section 514 and one end coupled to the reflective cone 518. As seen in FIG. 8, the diameter of the base of the reflective cone 518 is slightly smaller than the terminal diameter of the diverging section 514. Accordingly, an annular aperture 526 is defined to create the outlet of the expansion chamber 500.

Figure 9:
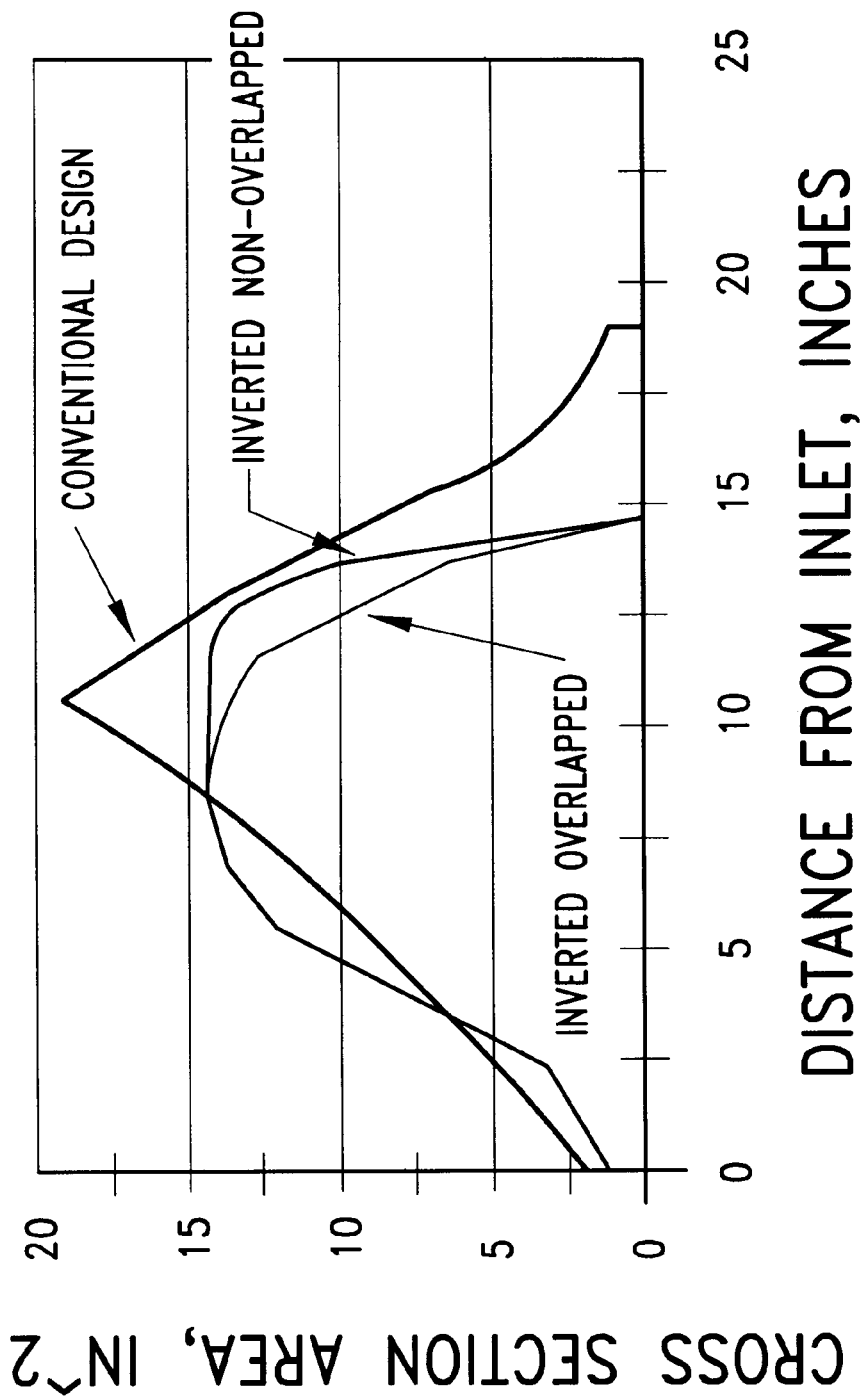
FIG. 9 is a chart illustrating the relation between cross-sectional area of the exhaust system with respect to the distance from the inlet.

FIG. 9 illustrates a plot of the cross-sectional area of the expansion chamber as a function of distance from the inlet. A first, second, and third curve correspond respectively to an exhaust system having a conventional design, a non overlapped reflective cone, and an overlapped reflective cone. As seen in the FIG. 9, the cross-sectional area of a conventional system reaches a maximum peak and abruptly begins to decrease. This abrupt change results in a discontinuity in the rate of change of cross-sectional area with respect to the distance from the inlet. The discontinuity creates inefficiencies within the expansion chamber, thus effecting the strength of the positive pressure wave. As illustrated by the second curve, an expansion chamber having a non-overlapped reflective cone does not produce any discontinuities. It is also possible to extend the maximum cross-sectional area over a predetermined distance based on the position of the inverted cone. Similarly, an exhaust system which incorporates an overlapped inverted cone produces a smoother cross-sectional area with respect to the distance from the inlet. By varying the position of the inverted cone, it is possible to provide multiple curves which all share the same cross-sectional area over the length of the diverging section. FIG. 9 also illustrates that the rate of change of cross-sectional area decreases near the end of a conventional expansion chamber. The rate of change of cross-sectional area on the expansion chambers which incorporate inverted reflective cones, however, show an increasing rate of change near the terminal end. This results in a correspondingly increased strength for the positive pressure wave which is directed to charge the cylinder at the end of the charging portion of the cycle.

Figure 10:
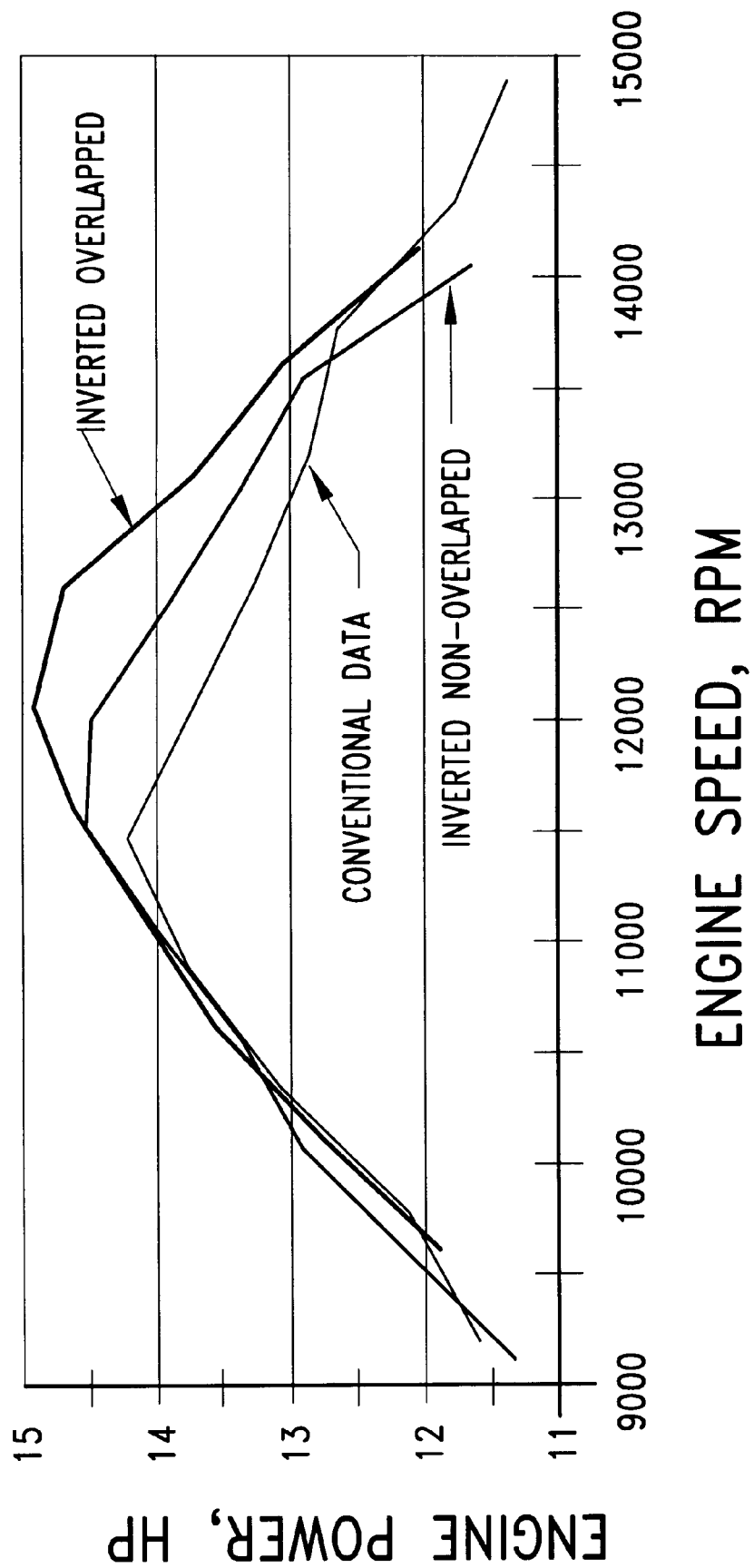
FIG. 10 is a horsepower curve of the inverted cone exhaust system and an exhaust system of the prior art.
Figure 11:
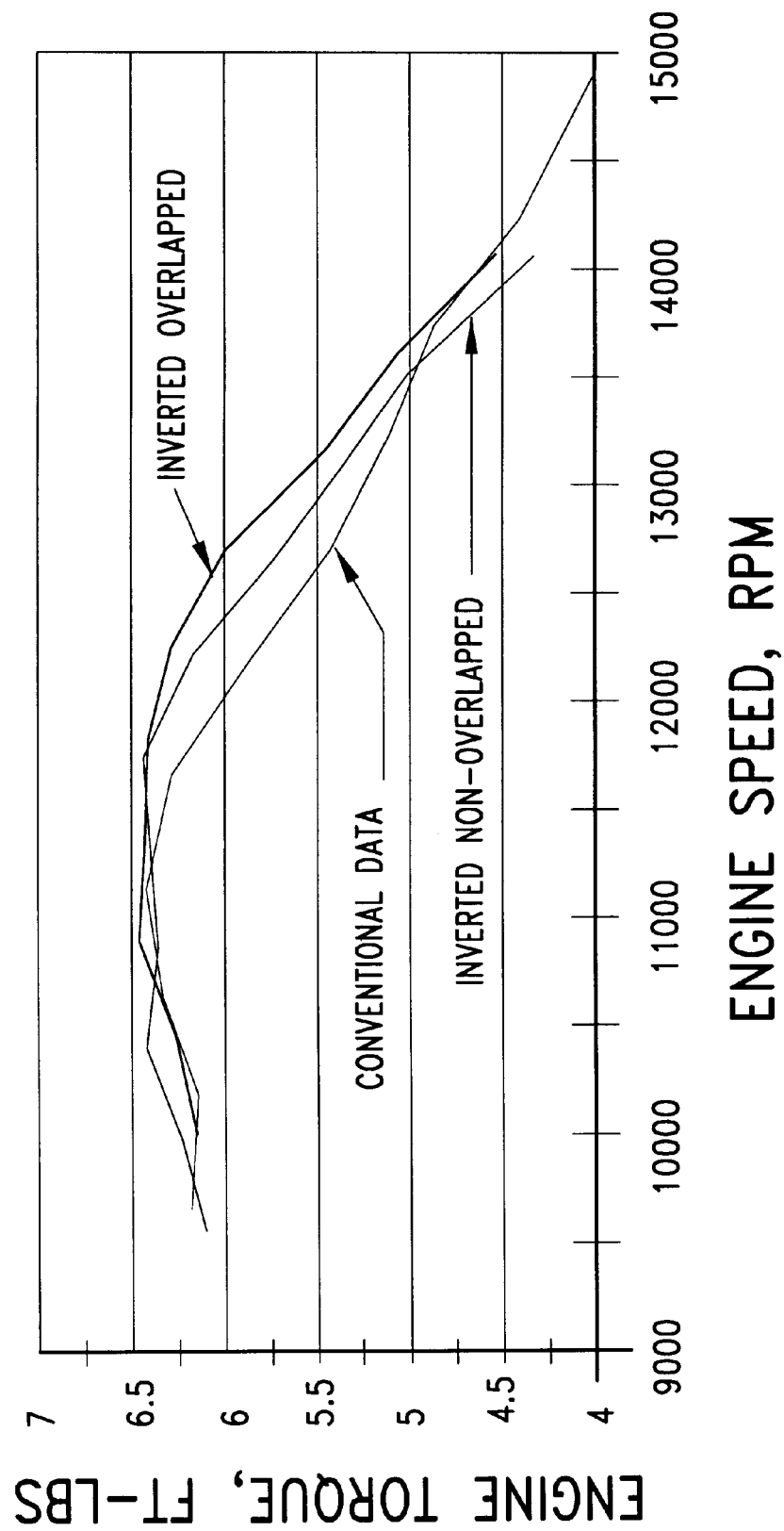
FIG. 11 is a torque curve of the inverted cone exhaust system and an exhaust system of the prior art.

FIGS. 10 and 11 illustrate plots of the actual performance data of an engine utilizing a modern conventional expansion chamber, an expansion chamber having a non-overlapped reflective cone, and an expansion chamber having an overlapped reflective cone. The vertical axes of FIGS. 10 and 11 represent the horsepower and torque produced by the engine, respectively. The horizontal axes of FIGS. 10 and 11 represent engine speed. The data for FIGS. 10 and 11 is measured on an engine dynamometer employing highly accurate electronic data acquisition means. The data for all three curves was collected on the same day, using the same engine. The only change which occurred was in the various expansion chambers tested. As seen in FIG. 10, an expansion chamber which incorporates a reflective cone gains a measurable amount of peak horsepower over the conventional exhaust system at the same engine speed. An expansion chamber which incorporates an overlapped reflective cone gains even more peak power, but at a slightly higher engine speed.

There is also an increase in peak torque, as seen in FIG. 11. While all three expansion chambers produce peak torque at approximately the same engine speed, the expansion chambers utilizing an inverted cone both produce increased torque. Furthermore, the increased torque extends to a higher engine speed with an overlapped reflective cone than with a non-overlapped reflective cone.

While the invention has been described with reference to a circular cross-sectional area, it will be appreciated by those skilled in the art that the shape of the cross-sectional area need not be a limiting factor. For example, the various sections of the expansion chamber may contain elliptical, square, or rectangular cross-sectional areas. Furthermore, the outlet may be defined by any combination of the embodiments described above. For example, the reflective cone may be truncated (shown in FIG. 5), and a plurality of apertures may be disposed on the reflective cone (shown in FIG. 1). Similarly, a plurality of apertures may be disposed on the terminal section (not shown), and on the reflective cone (shown in FIG. 1).

It is to be understood that the present invention is not limited to the sole embodiment described above, but encompasses any and all embodiments within the scope of the following claims.

We claim:

1. An expansion chamber in combination with an exhaust system of a two-stroke engine, the expansion chamber comprising:

an inlet of constant diameter having a first end connected to the exhaust system of the two-stroke engine and a second end directing exhaust gases into said expansion chamber;

a diverging section extending from the second end of said inlet, said diverging section having an increasing cross-sectional area;

a terminal section having one end integrally connected to said diverging section and an opposite terminal end, said terminal section including an interior surface;

an inverted reflective cone disposed substantially within said terminal section, said inverted reflective cone having an exterior surface and including an apex pointing toward said inlet and a base fixedly secured to said terminal section along the terminal end;

a converging section defined by a continually decreasing area contained between the exterior surface of said inverted reflective cone and the interior surface of said terminal section; and outlet means for directing exhaust gases out of said expansion chamber.

2. The combination as recited in claim 1 wherein said apex of said inverted reflective cone extends into a portion of said diverging section.

3. The combination as recited in claim 1 wherein the base of said inverted reflective cone has a diameter corresponding substantially to the diameter of said terminal section.

4. The combination as recited in claim 1 wherein said outlet means comprises a plurality of apertures disposed adjacent the base of said inverted reflective cone.

5. The combination as recited in claim 1 wherein said inverted reflective cone is truncated and said outlet means comprises an aperture formed from truncation of said inverted reflective cone.

6. The combination as recited in claim 1 wherein:

the base of said inverted reflective cone has a smaller diameter than the diameter of said terminal section; and the base of said inverted reflective cone and the terminal end of said terminal section are connected by an annular plate dimensioned to correspond to the difference between the diameter of the base of said reflective cone and the diameter of said terminal section.

7. The combination as recited in claim 6 wherein said outlet means further comprises a plurality of apertures disposed on said annular plate.

* * * * *